(12) United States Patent
Pandit et al.

(10) Patent No.: US 10,983,248 B2
(45) Date of Patent: Apr. 20, 2021

(54) WEATHER DATA COLLECTION THROUGH INCENTIVIZED AND COLLABORATIVE DRONE FLIGHTS

(71) Applicant: INTERNATIONAL BUSINESS MACHINES CORPORATION, Armonk, NY (US)

(72) Inventors: Sushain Pandit, Austin, TX (US); Su Liu, Austin, TX (US); Fang Wang, Westford, MA (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/123,646

(22) Filed: Sep. 6, 2018

(65) Prior Publication Data

US 2020/0081154 A1    Mar. 12, 2020

(51) Int. Cl.
*G01W 1/08* (2006.01)
*H04W 4/40* (2018.01)
*H04W 4/021* (2018.01)
*B64C 39/02* (2006.01)
*G06Q 30/02* (2012.01)

(52) U.S. Cl.
CPC .............. *G01W 1/08* (2013.01); *B64C 39/024* (2013.01); *G06Q 30/0207* (2013.01); *H04W 4/021* (2013.01); *H04W 4/40* (2018.02); *B64C 2201/125* (2013.01); *B64C 2201/145* (2013.01)

(58) Field of Classification Search
None
See application file for complete search history.

(56) References Cited

U.S. PATENT DOCUMENTS

| 5,240,207 | A | 8/1993 | Eiband et al. |
| 8,210,467 | B2 | 7/2012 | Hubbell et al. |
| 9,804,293 | B1* | 10/2017 | Fendell .................. G01W 1/06 |
| 9,952,352 | B2* | 4/2018 | Kirby .................... H04W 4/029 |
| 9,959,771 | B1* | 5/2018 | Carlson ................ G08G 5/0039 |
| 2013/0079128 | A1 | 3/2013 | Thomas et al. |

(Continued)

FOREIGN PATENT DOCUMENTS

| CN | 1586993 A | 3/2005 |
| EP | 8128338 A1 | 2/2017 |
| FR | 2913799 A1 | 9/2008 |

OTHER PUBLICATIONS

Beck, "Gamified drones will be one of the biggest toy trends of the year", https://mashable.com/2016/02/14/drones-gamified/#bMIB06tL_uqP, Feb 14, 2016, 4 pages.

(Continued)

*Primary Examiner* — Peter J Macchiarolo
*Assistant Examiner* — Jermaine L Jenkins
(74) *Attorney, Agent, or Firm* — Dmitry Paskalov (57) ABSTRACT

A computer receives a hotspot and a corresponding incentive, where the hotspot is a geolocation for collecting the weather data. The computer presents the received hotspot and the corresponding incentive to a user. The computer receives the weather data from the drone, transmits the weather data to a server, and updates a scorecard with the incentive corresponding to the hotspot based on determining that the drone reached the hotspot.

20 Claims, 5 Drawing Sheets

(56) References Cited

U.S. PATENT DOCUMENTS

| | | | |
|---|---|---|---|
| 2013/0117608 A1* | 5/2013 | Kirby | G01W 1/10 714/32 |
| 2014/0172194 A1 | 6/2014 | Levien et al. | |
| 2016/0111006 A1* | 4/2016 | Srivastava | G08G 5/0026 701/3 |
| 2017/0090069 A1* | 3/2017 | Kirby | H04W 4/029 |
| 2017/0090070 A1 | 3/2017 | Root et al. | |

OTHER PUBLICATIONS

Galimberti, "Can Drones Offer New Ways to Predict Storms, Save Lives?", https://www.accuweather.com/en/weather-news/drone-weather-safety-prediction/27739091, Jun. 1, 2014, 5 pages.

Jones-Cruise, "New Drones Could Improve Weather Predictions", https://learningenglish.voanews.com/a/new-drones-could-improve-weather-predictions/3258216.html, Mar. 31, 2016, 2 pages.

Patil et al., "Methods and System using crowdsourced detectors to detect In-Vehicle Weather Phenomenon", An IP.com Prior Art Database Technical Disclosure, IP.com Disclosure No. IPCOM000247070D, IP.com Electronic Publication Date: Aug. 2, 2016, Copyright: Honeywell International Inc., 16 pages.

Richardson, "Drones could revolutionize weather forecasts, but must overcome safety concerns", The Washington Post, Capital Weather Gang, https://www.washingtonpost.com/news/capital-weather-gang/wp/2014/04/25/drones-could-revolutionize-weather-forecasts-but-must-overcome-safety-concerns/, Apr. 25, 2014, 6 pages.

Mell, et al., "The NIST Definition of Cloud Computing," National Institute of Standards and Technology, U.S. Department of Commerce, Special Publication 800-145, Sep. 2011, pp. 1-7.

Wikipedia, "Kiip", https://en.wikipedia.org/wiki/Kiip, accessed Sep. 4, 2018, 4 pages.

Pandit et al., Pending U.S. Appl. No. 15/910,602, filed Mar. 2, 2018, titled "Microclimate Wind Forecasting", 62 pages.

\* cited by examiner

WEATHER DATA COLLECTION THROUGH INCENTIVIZED AND COLLABORATIVE DRONE FLIGHTS

BACKGROUND

The present invention relates, generally, to the field of computing, and more particularly to micro-climate data collection using specifically incentivizing drone flying through hotspots by gamified network participation.

Drones are unmanned aerial vehicles that are typically combined with a client computing device and a system of communications between them. In recent years, drones have become widely used for gamifying drone flying using augmented reality. Augmented Reality (AR) is an interactive experience of a real-world environment whereby the objects that reside in the real-world are "augmented" by computer-generated perceptual information, sometimes across multiple visual, auditory or other sensory modalities.

A micro-climate is a local set of atmospheric conditions at a specific geolocation that differ from those in the surrounding areas, often with a slight difference but frequently required for climate analysis. The term may refer to areas as small as a few square meters or square feet.

A geolocation is the identification or estimation of the real-world geographic location of an object, such as a radar source, mobile phone, or Internet-connected computer terminal. In its simplest form geolocation involves the generation of a set of geographic coordinates and is closely related to the use of positioning systems, such as Global Positioning System (GPS).

A GPS is a satellite-based global radio-navigation system that provides geolocation and time information to a GPS receiver anywhere on or near the Earth where there is an unobstructed line of sight to four or more GPS satellites.

SUMMARY

According to one embodiment, a method, computer system, and computer program product for hotspot broadcasting is provided. The present invention may include a computer receives a hotspot and a corresponding incentive, where the hotspot is a geolocation for collecting the weather data. The computer presents the received hotspot and the corresponding incentive to a user. The computer receives the weather data from the drone, transmits the weather data to a server, and updates a scorecard with the incentive corresponding to the hotspot based on determining that the drone reached the hotspot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to micro-climate data collection using specifically incentivizing drone flying through hotspots, such as by using gamified network participation. The following described exemplary embodiments provide a system, method, and program product to, among other things, incentivize drone flying through specific geolocations (hotspots) in order to gather valuable weather observations. Therefore, the present embodiment has the capacity to improve the technical field of sparse atmospheric data collection and thus improve weather forecasting by creating an incentive for drone owners to collect the necessary weather related data. In addition, this approach may improve atmospheric data collection that crowdsources the measurement activity, reduce the need to hire dedicated measurement crew, perform flexible spatial coverage in a short amount of time, and reduce atmospheric data collection costs.

As previously described, micro-climate is a local set of atmospheric conditions at a specific geolocation that differ from those in the surrounding areas, often with a slight difference but frequently required for climate analysis. The term may refer to areas as small as a few square meters or square feet. Weather data collection for accurate forecasting, prediction, analytics and insights becomes an increasingly important. However, weather collecting equipment is typically static and therefore, accurate analysis of the weather may be incorrect due to sparse weather data received form the weather collecting equipment. Expanding sparse data received from different locations, at a current date and time may improve weather data analysis such as weather forecasting, wildfire spreading rates, etc. As such, it may be advantageous to, among other things, implement a system that incentivizes collaborative drone flights at a specific geolocations in order to collect weather data and improve weather data analysis.

Weather data collection for accurate forecasting, prediction, analytics and insights has become an increasingly important area, both from an academic as well as commercial standpoint. There have been atmospheric field experiments in which various measurements are taken for a specific project. For instance, there is a list from the Earth Observing Laboratory designed to investigate vertical enhanced mixing, aerosol transport, or the atmospheric boundary layer. Another well-known, ground-based observation facility is the Atmospheric Radiation Measurements created by US Department of Education, whose data have been used extensively for atmospheric research and validation.

When it comes to accurate forecasting, one of the primary hindrances faced today is due to sparse data. The more data points there are, the more accurate the predictions would be. However, the field experiments (like the ones described above) are very costly and spatially limited. It takes a long time to propose, fund, and carry out the field trips to get the data. It also needs specially-trained staff to perform the measurements. Some interesting atmospheric phenomena are transient and can happen anywhere. Therefore, it is near-impossible to gather valuable observations through the traditional field measurements.

According to one embodiment, a special software may be implemented such as a hotspot broadcasting program in order to incentivize drone flying through a set of hotspots (geolocations) in order to aid micro weather data collection. In addition, the hotspot broadcasting program may incorporate an incentive for a user to reach with a drone the transmitted hotspot location at a requested time and date in order to collect the necessary weather data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a model based on historical user information and meeting information that is capable of automatically modifying the contents of a computer display screen shared during a screen sharing session.

Figure 1:
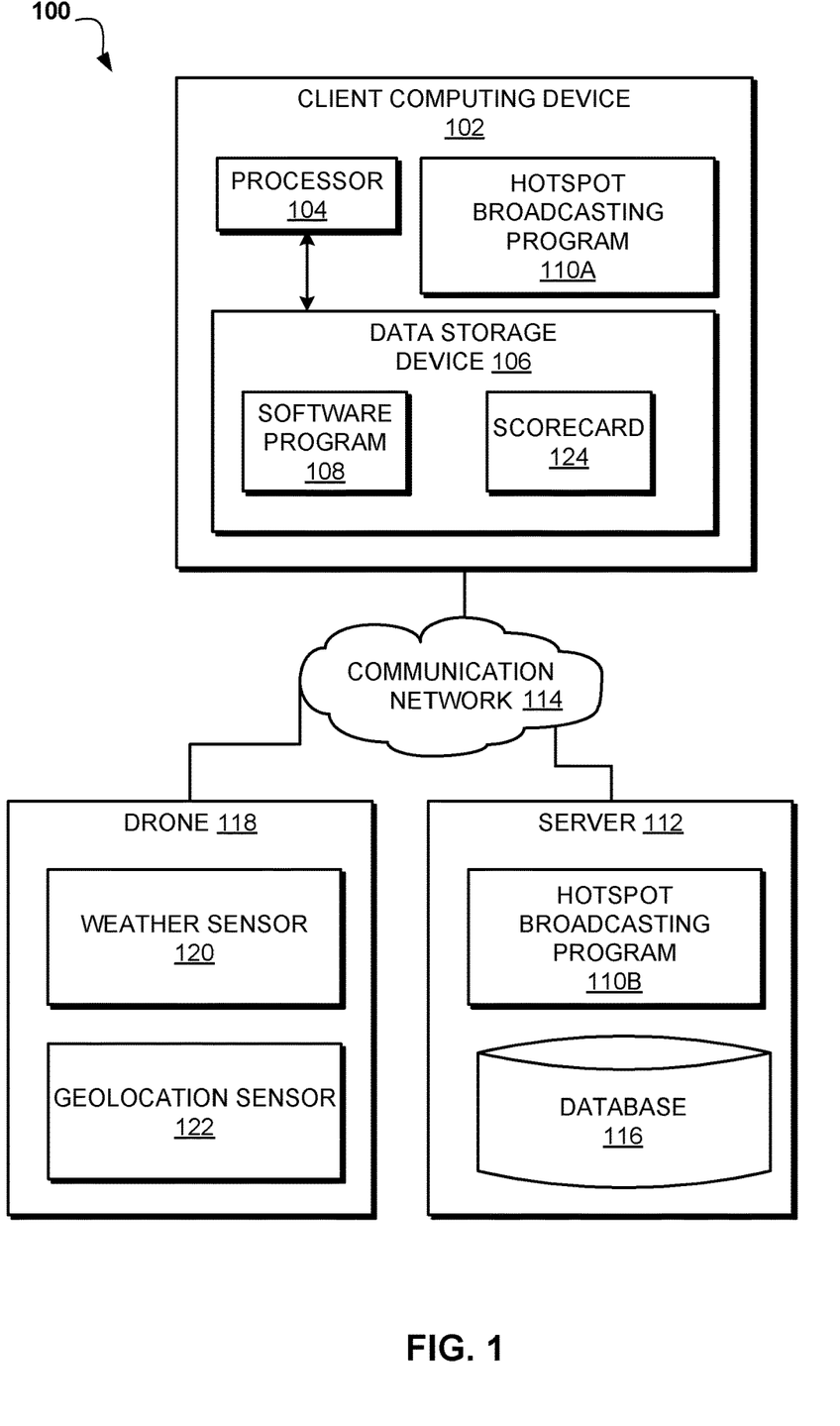
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, server 112, and drone 118 interconnected via a communication network 114. According to at least one implementation, the networked computer environment 100 may include a plurality of client computing devices 102, servers 112, and drones 118 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, a scorecard 124, and a hotspot broadcasting program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively. According to an example embodiment, scorecard 124 may be a dataset that is accessible by the hotspot broadcasting program 110A and stores geolocations that were reached by drone 118. In another embodiment, the scorecard 124 may be stored at the database 116 on server 112.

The server 112 may be a laptop computer, netbook computer, personal computer (PC), a desktop computer, or any programmable electronic device or any network of programmable electronic devices capable of hosting and running a hotspot broadcasting program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Drone 118 is an unmanned aerial vehicles that is configured to be controlled by a client computing device 102 and may include a weather sensor 120 and a geolocation sensor 122. According to an example embodiment, the weather sensor 120 may incorporate an array of sensors capable of measuring temperature, speed, humidity and other values required for weather forecasting. In another embodiment, the weather sensor 120 may incorporate sensors for chemical analysis of the air, such as carbon monoxide, carbon dioxide, ozone or other gases identifiers and analyzers. In further embodiments, the weather sensor 120 may broadcast drone speed and rotation parameters of the engines of the drone which may allow for calculation of windspeed by finding a difference between the calculated speed of a drone based on the rotation of the engines to the actual speed calculated from the change of the geolocation of the drone received from the geolocation sensor 122. Geolocation sensor 122 may be a GPS transponder capable of transmitting geolocation data through communication network 114, or other device capable of determining a geolocation of the drone 118, such as by using triangulation based on a signal received from client computing device 102, server 112, and/or antennas that enable the communication network 114.

According to the present embodiment, the hotspot broadcasting program 110A, 110B may be a program capable of receiving hotspots that are required for atmospheric measurements, using incentivization methods, such as gamification, to encourage a user of drone 118 to fly and take weather measurements using weather sensor 120. In addition, the hotspot broadcasting program 110A, 110B may update the scorecard 124 when the measures from the hotspot were received, and store the measurements in the database 116. The weather data collection through incentivized and collaborative drone flights is explained in further detail below with respect to FIG. 2.

Figure 2:
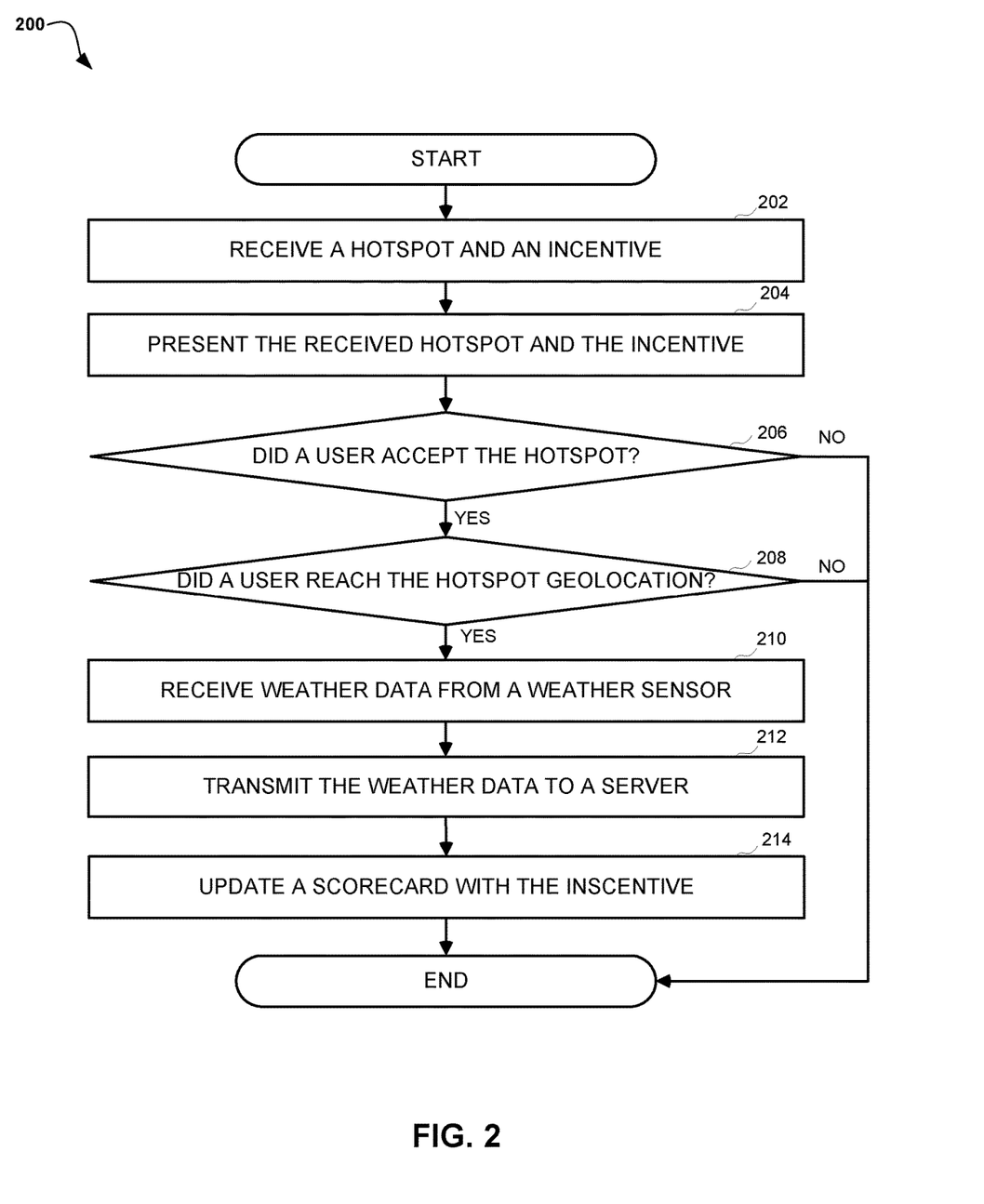
FIG. 2 is an operational flowchart illustrating a hotspot broadcasting and incentivizing process according to at least one embodiment.

Referring now to FIG. 2, an operational flowchart illustrating a hotspot broadcasting and incentivizing process 200 is depicted according to at least one embodiment. At 202, the hotspot broadcasting program 110A, 110B receives a hotspot and an incentive. According to an example embodiment, one or more geolocations coupled with a corresponding incentive are received or accessed from the database 116 or another server. A corresponding incentive may be received from server 112 or be an integral part of the hotspot broadcasting program 110A, 110B. In further embodiments, the hotspot may include an expiration time after which the incentive is no longer valid. For example, the incentive may be monetary-based or point-based that may be converted into specific features of a computer game. In further embodiments, the incentive may be constant or dependent on the distance between the hotspot and the drone 118 location. Yet in further embodiments, the incentive may require additional performance such as flying through the same hotspot several times in order to receive more accurate measurements. Yet in further embodiments, there may be special incentive for cooperative behavior. This may be useful if, depending on the topology of the land or certain weather conditions, it is necessary to gather weather data at multiple hotspots simultaneously.

Next, at 204, hotspot broadcasting program 110A, 110B presents the received geolocation and the incentive. According to an example embodiment, hotspot broadcasting program 110A, 110B may display the geolocation and the incentive on the client computing device 102. For example, if hotspot broadcasting program 110A, 110B supports gamification platform that may be incorporated in hotspot broadcasting program 110A, 110B or software program 108, the geolocation may be presented as a target on a map in the game and if the user navigates or flies through the target using drone 118, the user may receive an award equal to the incentive. In another embodiment, hotspot broadcasting program 110A, 110B may present the received geolocation hotspot in the format of longitude, latitude and elevation.

Then, at 206, the hotspot broadcasting program 110A, 110B determines whether a user accepted the geolocation. According to an example embodiment, a user may receive a message on client computing device 102 and either accept or reject it. In another embodiment, if a distance between the geolocation of drone 118 and a received hotspot decreases after a predetermined time the hotspot broadcasting program 110A, 110B may determine that the user accepted the received geolocation. If the hotspot broadcasting program 110A, 110B determines that a user accepted the hotspot (step 206, "YES" branch), the hotspot broadcasting program 110A, 110B may continue to step 208 to check whether the user reached the hotspot geolocation with drone 118. If the hotspot broadcasting program 110A, 110B determines that a user rejected the hotspot (step 206, "NO" branch), the hotspot broadcasting program 110A, 110B may terminate.

Then, at 208, the hotspot broadcasting program 110A, 110B determines whether a user reached the hotspot geolocation. According to an example embodiment, hotspot broadcasting program 110A, 110B may receive a geolocation of the drone 118 by receiving geolocation coordinates from a geolocation sensor 122. If the received coordinates are within a predetermined vicinity of the hotspot, such as within 1-5 feet, then the user reached the hotspot geolocation. To the contrary, according to an example embodiment, if the user did not reach the hotspot geolocation within a specific timeframe, then the user did not reach the hotspot geolocation. In further embodiment, if another user reached the hotspot geolocation before the current user reaches it, the hotspot broadcasting program 110A, 110B may determine that the current user did not reach the hotspot geolocation. If the hotspot broadcasting program 110A, 110B determines that the user reached the hotspot geolocation (step 208, "YES" branch), the hotspot broadcasting program 110A, 110B may continue to step 210 to receive the weather data from a weather sensor. If the hotspot broadcasting program 110A, 110B determines that the user did not reach the hotspot geolocation (step 208, "NO" branch), the hotspot broadcasting program 110A, 110B may terminate.

Next, at 210, hotspot broadcasting program 110A, 110B receives weather data from a weather sensor. According to an example embodiment, hotspot broadcasting program 110A, 110B may receive required weather data from weather sensor 120 using communication network 112. In another embodiment, hotspot broadcasting program 110A, 110B may use other data from drone 118 to calculate weather data by using data received from drone 118 geolocation sensor 122 and other drone 118 parameters. For example, hotspot broadcasting program 110A, 110B may receive actual geolocation changes of drone 118 within a predetermined timeframe and by comparing the data to drone flight parameters determine the speed of wind and the direction of the wind. In further embodiments, the weather data may be calculated using a method of local wind turbulence pattern service based on drone flying tracking analysis that is known and allows analysis of wind and weather patterns based on drone trajectory adjustments without necessarily relying on explicit presence of the weather sensor.

Next, at 212, hotspot broadcasting program 110A, 110B transmits the weather data to a server. According to an example embodiment, hotspot broadcasting program 110A, 110B may transmit the weather data received from weather sensor 120 to server 112. In another embodiment, hotspot broadcasting program 110A, 110B may determine only required weather parameters, such as temperature only, and transmit the value to the server 112 only. In further embodiment, hotspot broadcasting program 110A, 110B may determine the speed of the wind by comparing data from a geolocation sensor 122 to a calculated speed of drone 118 by obtaining engine parameters, determine the wind speed and its direction and transmit it to server 112.

Next, at 214, hotspot broadcasting program 110A, 110B updates a scorecard with the incentive. According to an example embodiment, hotspot broadcasting program 110A, 110B may update the scorecard 124 with the incentive corresponding to the hotspot. For example, if the user was promised to get paid $10 for reaching the specific hotspot and transmitting the weather data from the hotspot, by transmitting the data the scorecard 124 will be updated with data of the incentive value, i.e. $10. In another embodiment, the incentive may be in game points that may be converted to other game related benefits. In further embodiment, scorecard 124 may be located on server 112 in order to prevent the user from hacking or altering the scorecard 124.

It may be appreciated that FIG. 2 provides only an illustration of one implementation and does not imply any limitations with regard to how different embodiments may be implemented. Many modifications to the depicted environments may be made based on design and implementation requirements.

Figure 3:
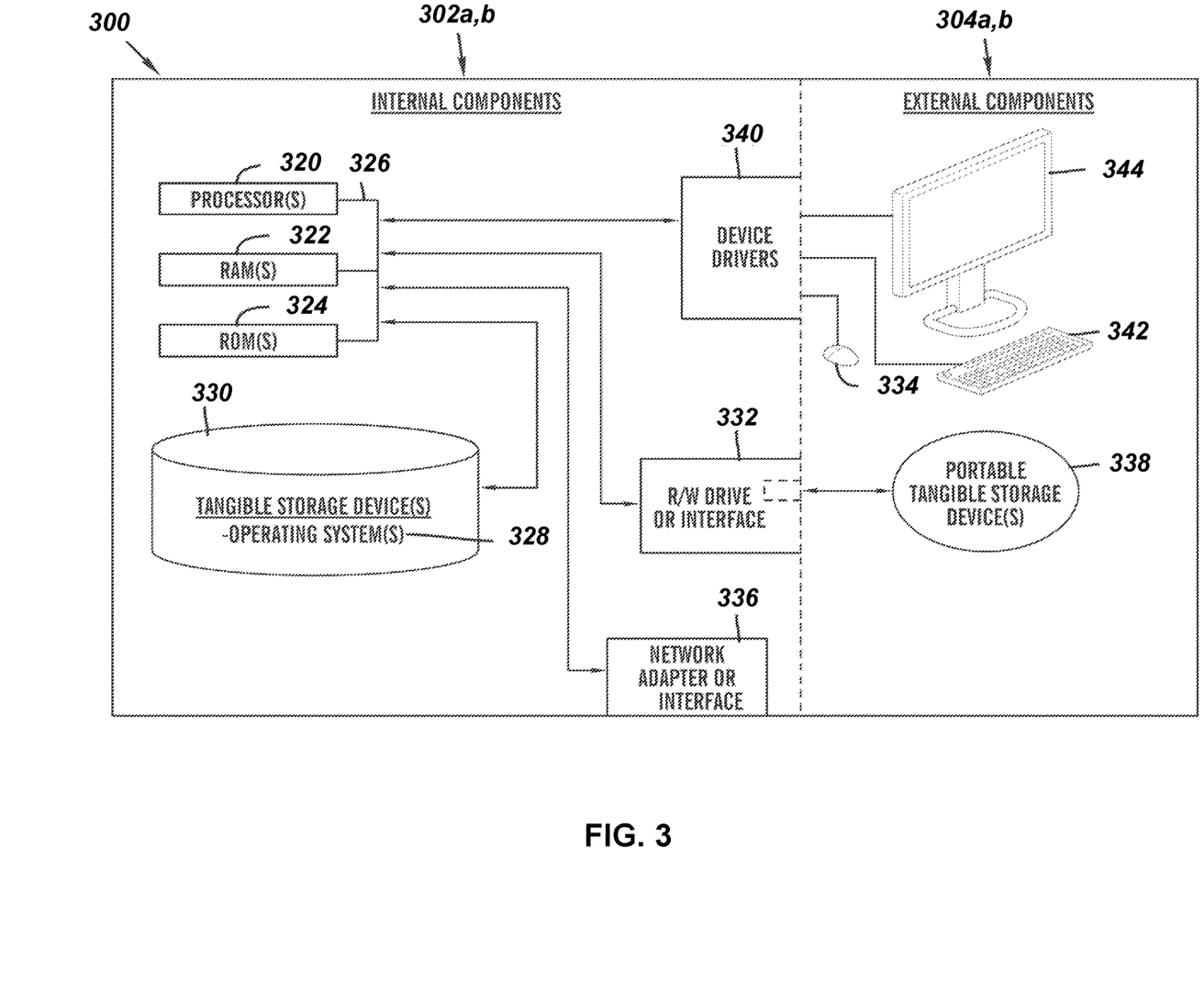
FIG. 3 is a block diagram of internal and external components of client computing device, server, and drone as depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the hotspot broadcasting program 110A in the client computing device 102, and the hotspot broadcasting program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the hotspot broadcasting program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the hotspot broadcasting program 110A in the client computing device 102 and the hotspot broadcasting program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the hotspot broadcasting program 110A in the client computing device 102 and the hotspot broadcasting program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
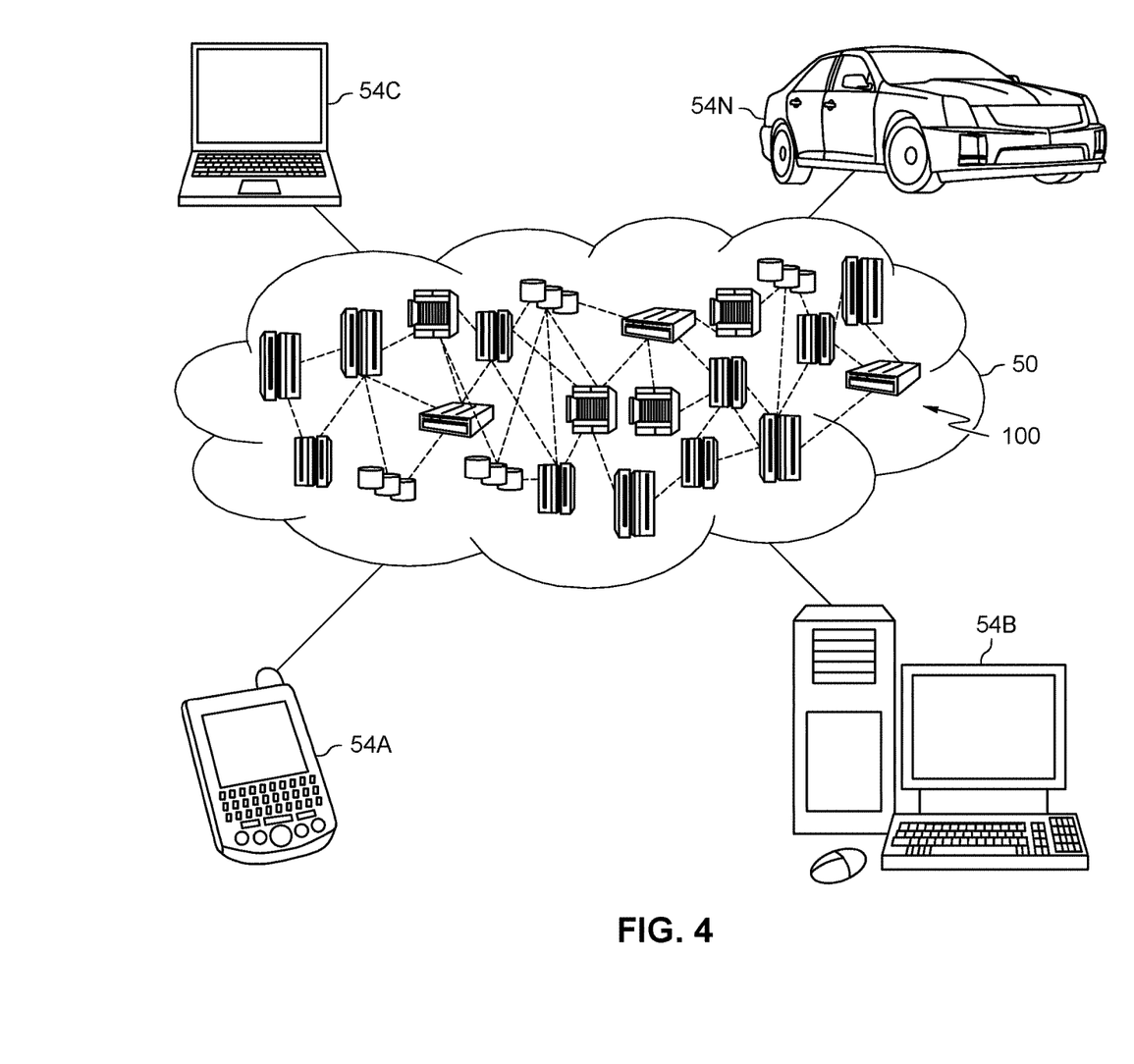
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
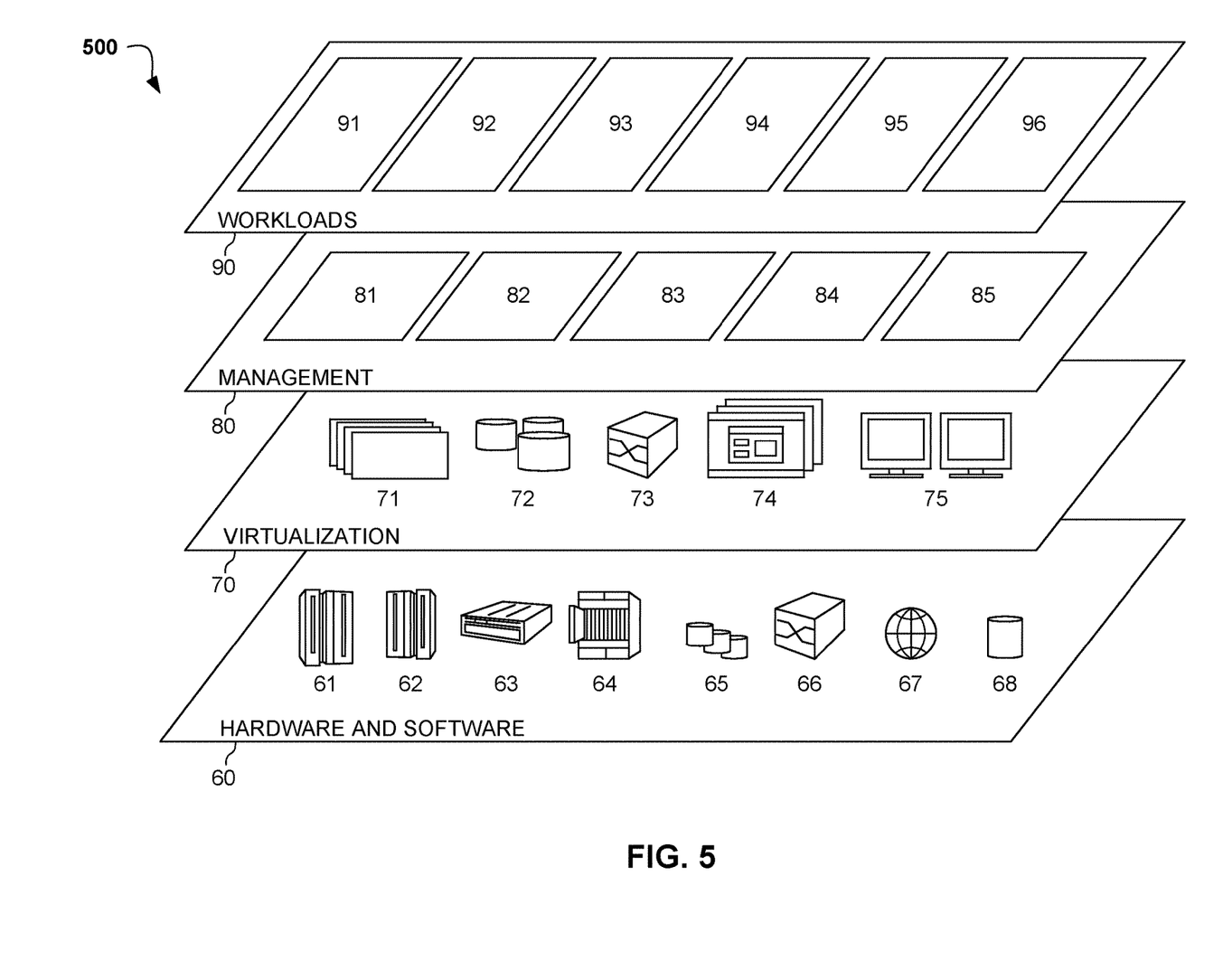
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hotspot broadcasting management 96. Hotspot broadcasting management 96 may relate receiving a plurality of hotspots and a plurality of incentives for collecting weather data from each of the hotspots and assigning the incentives to each user based on the broadcasted weather data for each hotspot that the user reached with his drone.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for collecting weather data through incentivized flight, the method comprising:
   receiving a hotspot and a corresponding incentive, wherein the hotspot is a geolocation for collecting the weather data by a drone, wherein the drone comprises a geolocation sensor;
   presenting the received hotspot and the corresponding incentive to a user; and
   based on determining, using the geolocation sensor, that the drone reached the hotspot:
   receiving the weather data from the drone;
   transmitting the weather data to a server; and
   updating a scorecard with the corresponding incentive to the hotspot.

2. The method of claim 1, wherein the drone further comprises:
   a weather sensor for collecting the weather data at the hotspot.

3. The method of claim 2, wherein the geolocation sensor is a Global Positioning System (GPS) transponder.

4. The method of claim 1, wherein the hotspot is a geolocation comprising a longitude, a latitude and an elevation.

5. The method of claim 1, further comprising determining whether the user accepted the received hotspot and the corresponding incentive.

6. The method of claim 5, wherein the determining whether the user accepted the received hotspot and the corresponding incentive is based on a change in distance between the geolocation of the drone and the received hotspot within a predetermined timeframe.

7. The method of claim 1, wherein determining that the drone reached the hotspot is based on whether the drone is in a predefined vicinity from the received hotspot at a specific timeframe.

8. A computer system for collecting weather data through incentivized flight, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a hotspot and a corresponding incentive, wherein the hotspot is a geolocation for collecting the weather data by a drone, wherein the drone comprises a geolocation sensor;
   presenting the received hotspot and the corresponding incentive to a user; and
   based on determining, using the geolocation sensor, that the drone reached the hotspot:
      receiving the weather data from the drone;
      transmitting the weather data to a server; and
      updating a scorecard with the incentive corresponding to the hotspot.

9. The computer system of claim 8, wherein the drone further comprises:
   a weather sensor for collecting the weather data at the hotspot.

10. The computer system of claim 9, wherein the geolocation sensor is a Global Positioning System (GPS) transponder.

11. The computer system of claim 8, wherein the hotspot is a geolocation comprising a longitude, a latitude and an elevation.

12. The computer system of claim 8, further comprising determining whether the user accepted the received hotspot and the corresponding incentive.

13. The computer system of claim 12, wherein the determining whether the user accepted the received hotspot and the corresponding incentive is based on a change in distance between the geolocation of the drone and the received hotspot within a predetermined timeframe.

14. The computer system of claim 8, wherein determining that the drone reached the hotspot is based on whether the drone is in a predefined vicinity from the received hotspot at a specific timeframe.

15. A computer program product for collecting weather data through incentivized flight, the computer program product comprising:
   one or more computer-readable tangible storage medium and program instructions stored on at least one of the one or more tangible storage medium, the program instructions executable by a processor, the program instructions comprising:
   program instructions to receive a hotspot and a corresponding incentive, wherein the hotspot is a geolocation for collecting the weather data by a drone, wherein the drone comprises a geolocation sensor;
   program instructions to present the received hotspot and the corresponding incentive to a user; and
   based on determining, using the geolocation sensor, the drone reached the hotspot:
      program instructions to receive the weather data from the drone;
      program instructions to transmit the weather data to a server; and
      program instructions to update a scorecard with the corresponding incentive to the hotspot.

16. The computer program product of claim 15, wherein the drone further comprises:
   a weather sensor for collecting the weather data at the hotspot.

17. The computer program product of claim 16, wherein the geolocation sensor is a Global Positioning System (GPS) transponder.

18. The computer program product of claim 15, wherein the hotspot is a geolocation comprising a longitude, a latitude and an elevation.

19. The computer program product of claim 15, further comprising program instructions to determine whether the user accepted the received hotspot and the corresponding incentive.

20. The computer program product of claim 19, wherein program instructions to determine whether the user accepted the received hotspot and the corresponding incentive is based on a change in distance between the geolocation of the drone and the received hotspot within a predetermined timeframe.

* * * * *